US011487601B2

(12) United States Patent
Smaalders et al.

(10) Patent No.: US 11,487,601 B2
(45) Date of Patent: Nov. 1, 2022

(54) PERSISTENT CRASH LOGGING

(71) Applicant: Arista Networks, Inc., Santa Clara, CA (US)

(72) Inventors: Bart Smaalders, Menlo Park, CA (US); Roman Olegovich Chertov, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 296 days.

(21) Appl. No.: 16/831,710

(22) Filed: Mar. 26, 2020

(65) Prior Publication Data

US 2021/0303384 A1 Sep. 30, 2021

(51) Int. Cl.
*G06F 11/00* (2006.01)
*G06F 11/07* (2006.01)
*G06F 3/06* (2006.01)

(52) U.S. Cl.
CPC ........ *G06F 11/0778* (2013.01); *G06F 3/0604* (2013.01); *G06F 3/0659* (2013.01); *G06F 3/0679* (2013.01); *G06F 11/0751* (2013.01)

(58) Field of Classification Search
CPC ............. G06F 11/0778; G06F 11/0751; G06F 3/0604; G06F 3/0659; G06F 3/0679
See application file for complete search history.

(56) References Cited

U.S. PATENT DOCUMENTS

| 2008/0294839 | A1* | 11/2008 | Bell | G06F 11/0778 711/111 |
| 2014/0032965 | A1* | 1/2014 | Tsukamoto | G06F 11/0706 714/30 |
| 2016/0139995 | A1* | 5/2016 | Takami | G06F 11/1441 714/23 |
| 2017/0185467 | A1* | 6/2017 | Xiao | G06F 11/079 |
| 2020/0334102 | A1* | 10/2020 | Abdelhalim | G06F 9/4406 |
| 2021/0303384 | A1* | 9/2021 | Smaalders | G06F 11/0787 |

FOREIGN PATENT DOCUMENTS

CN 110865898 A * 3/2020

* cited by examiner

*Primary Examiner* — Philip Guyton

(57) ABSTRACT

Techniques for persistent crash logging. The techniques may include making, by a monitor, a first determination that an event information file exists in a volatile storage device location in a volatile storage device. The first determination may be made after an agent event occurs. The techniques may also include performing, by the monitor, an action on a portion of the event information file to obtain a uniquely identifiable filename portion and writing, by the monitor, an event information file copy to a non-volatile storage location in a non-volatile storage device. The techniques may also include, after writing the event information file copy to the non-volatile storage location is complete, renaming, by the monitor, the event information file copy to a uniquely identifiable filename comprising the uniquely identifiable filename portion.

17 Claims, 3 Drawing Sheets

PERSISTENT CRASH LOGGING

BACKGROUND

Computing devices (e.g., network devices) often execute software processes (e.g., agents). Such software processes may stop unexpectedly (e.g., crash) from time to time. During such an event, the software process may be configured to write various items of information (e.g., register contents, stack trace, etc.) to an error log file. Such a log file is often written to a volatile storage device (e.g., random access memory). As such, the contents of the log file may be lost if the computing device is power cycled prior to a retrieval and/or save of the log file.

DETAILED DESCRIPTION

Figure 1:
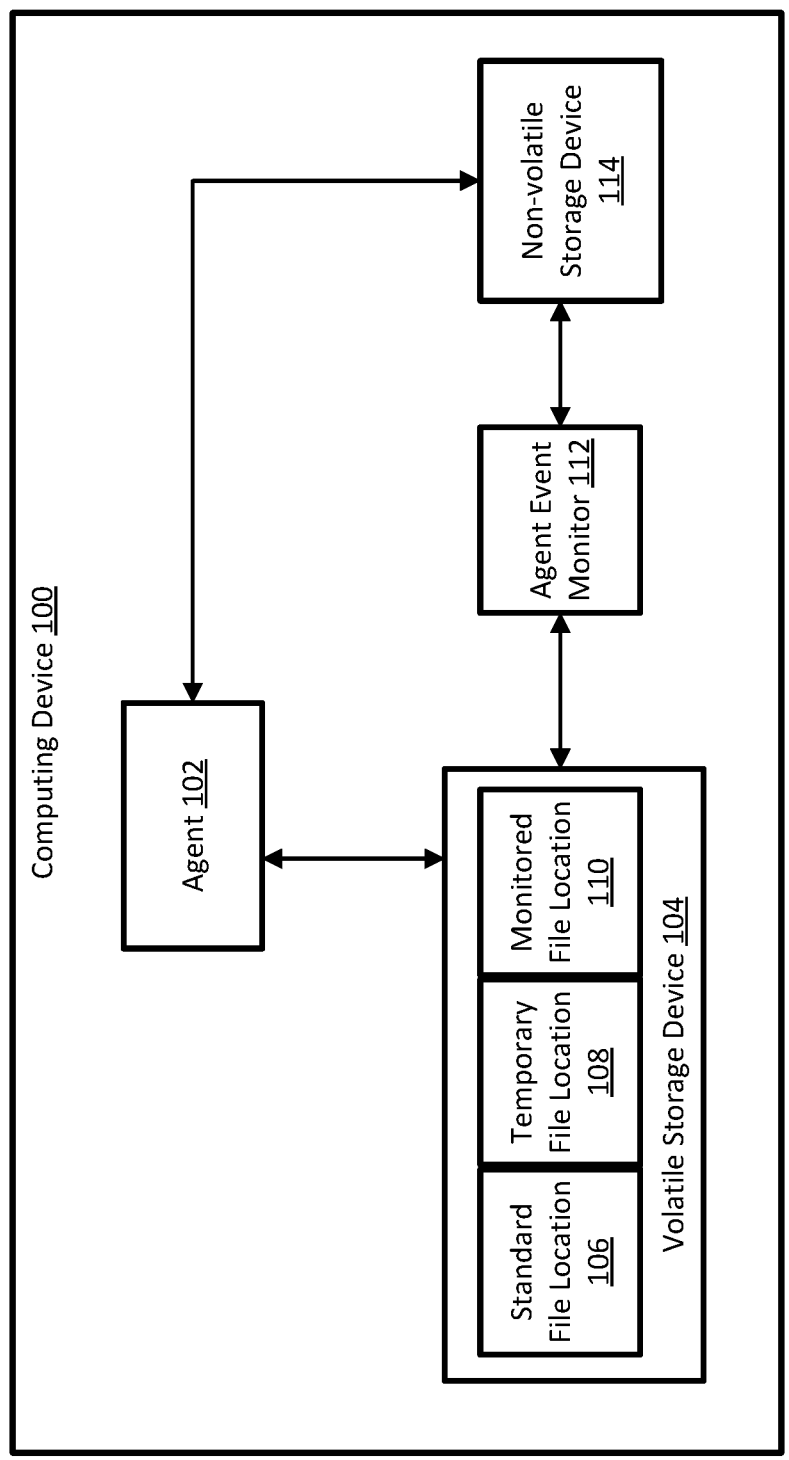
FIG. 1 shows a system in accordance with one or more embodiments described herein.

Specific embodiments will now be described with reference to the accompanying figures.

In general, embodiments described herein relate to techniques for storing agent event information files (e.g., agent crash files) in non-volatile storage (e.g., flash memory). In one or more embodiments, because of the writes to non-volatile storage device, event information files remain available for debugging purposes even after a power cycle of a computing device. Agent event information files are traditionally written to volatile storage (i.e., not non-volatile storage), and thus are lost during a power cycle of a computing device. Writing the agent event information files to non-volatile storage causes the agent event information files to be stored in a location where data persists through a power cycle event.

In one or more embodiments, the storage to non-volatile storage is performed in a reliable and storage space efficient manner with minimal impact on agent restart times. The need to make the technique space efficient may arise from the limited storage capacity available to a computing device, such as a network device, which may, for example, have flash storage of a finite capacity that is already storing an operating system image(s) and possibly other information.

In one or more embodiments, when an agent experiences an agent event (e.g., a crash), the agent writes one or more files (e.g., agent event information files) with various items of information (register contents, stack trace, etc.) to a location in a volatile storage device. Such files may be used, for example, to debug the agent event. However, if the computing device on which the agent executes power cycles, the files may be lost, making debugging difficult (e.g., during a customer escalation where a customer wants to know why the agent event happened).

Embodiments described herein address that problem by causing the files (relating to the event) to be written to non-volatile storage, so they are not lost when a device is power cycled. Such a change in agent behavior may be in addition to the traditional behavior (i.e., of writing to a volatile storage device) so that computing device users may still use standard debugging practices.

Various techniques may be used to write the agent event information files to non-volatile storage. First, in one or more embodiments, the agent is modified (e.g., signal handler behavior is altered) to write the agent event information file to the normal/standard location in a volatile storage device and to a second location in a volatile storage device, which may be referred to as a temporary storage location in the volatile storage device. In general, writing to a volatile storage device first instead of directly to non-volatile storage may be because such writes are often faster than writes to a non-volatile storage device, and it may be disadvantageous to have the restart of an agent (which often will not occur until agent event information file writing is complete) be required to wait until completion of the write to non-volatile storage. As is discussed further in the description of FIG. 2, below, the write to the normal/standard location may allow for standard debugging to begin on that copy of the agent event information file. As is also discussed further in the description of FIG. 2, below, the write to the second location may allow for the write to complete prior to the agent event information file being copied to a monitored location (discussed below).

In one or more embodiments, once the write to the second location in a volatile storage device is complete, the agent event information file is moved (e.g., copied, renamed, etc.) into a separate directory in the volatile storage device that is being monitored (e.g., using inotify) by a service (e.g., a daemon). Waiting until the write is complete to put an agent event information file in the monitored location may have the benefit of not 'waking' a monitoring service unnecessarily to begin operating unpredictably on an incomplete agent event information file.

In one or more embodiments, once the service (which may be referred to as a monitor) discovers that an agent event information file has appeared in the monitored directory, the service performs a hash on a portion of the agent event information file (e.g., the symbolic portion of the stack trace) that is unlikely to change if the agent event is the same from one occurrence to the next (e.g., in the case of repeated agent crashes for the same reason(s)).

Next, in one or more embodiments, the service checks if a configured maximum quantity of agent event information files has already been stored in the non-volatile storage. In one or more embodiments, if the maximum quantity of agent event information files has not been reached, the service writes the agent event information file to a temporary location in the non-volatile storage.

In one or more embodiments, once the write is completed, the file is renamed to a filename that is a uniquely identifiable filename (e.g., a file name that includes a combination of the agent name and the hash value. Such a renaming may help save storage space, because if there is already an agent event information file with the exact same uniquely identifiable filename (e.g., the agent name plus identical hash value), the new agent event information file replaces the old agent event information file, thereby avoiding redundant copies being stored.

In one or more embodiments, if the service determines that the maximum quantity of agent event information files is already being stored in the non-volatile storage, additional analysis is required prior to the rename. In one or more embodiments, certain agents (e.g., a system database agent) are more important than other agents (e.g., a light emitting diode (LED) agent). Accordingly, in one or more embodiments, certain agents are assigned a higher priority than other agents. Such a priority may be implemented, for example, by setting a rule that an LED agent event information file must be more than X days newer than the system database agent event information file before the LED agent is stored and the system database agent event information file is deleted.

In one or more embodiments, if there are no agent event information files in the non-volatile storage with an equal or lesser priority assigned, the new agent event information file may be discarded. In one or more embodiments, if there are any agent event information files that are older and have an equal or lesser priority than the new agent event information file, the older agent event information file is deleted and the new agent event information file is written as described above (including the rename), thereby ensuring that the quantity of agent event information files does not exceed the configured maximum quantity of agent event information files allowed.

In one or more embodiments, at the end of the above-described process, relevant agent event information files are stored in non-volatile storage and may thereafter be used to debug agent events (e.g., crashes), even after a power cycle of the computing device on which the agent event (e.g., agent crash) occurred.

FIG. 1 shows a computing device in accordance with one or more embodiments described herein. Computing device (100) shown in FIG. 1 is only one example of a particular computing device. One having ordinary skill in the art, and the benefit of this Detailed Description, will appreciate that the techniques described herein may apply to any number of different computing devices. Accordingly, embodiments described herein should not be considered limited to computing device (100) shown in FIG. 1.

As shown in FIG. 1, computing device (100) includes any number of agents (e.g., agent (102)) and volatile storage device (104). In one or more embodiments, volatile storage device (104) includes standard file location (106), temporary file location (108), and monitored file location (110). In one or more embodiments, computing device (100) also includes agent event monitor (112) and non-volatile storage device (114). Each of these components is described below.

In one or more embodiments, computing device (100) is any device or any set of devices capable of electronically processing instructions and may include, but is not limited to, any of the following: one or more processors (e.g. components that include integrated circuitry) (not shown), memory (e.g., random access memory (RAM) (not shown)), input and output device(s) (not shown), persistent storage, one or more physical interfaces (e.g., network ports) (not shown), any number of other hardware components (not shown) and/or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described below, a virtual machine executing using underlying hardware components, and/or any other type of computing device with the aforementioned requirements.

In one or more embodiments, computing device (100) is a network device. In one or more embodiments, a network device is a physical device that includes and/or is operatively connected to persistent storage (not shown), memory (e.g., random access memory (RAM)) (not shown), one or more processor(s) (e.g., integrated circuits) (not shown), and at least one physical network interface (not shown). Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the physical network interfaces (i.e., ports) of the network device and to process the network traffic data units. In one or more embodiments, processing a network traffic data unit includes, but is not limited to, a series of one or more table lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a pipeline, and may be, for example, programmed as a match-action pipeline. Examples of pipeline processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device.

In one or more embodiments, the network device is part of a network (not shown). A network (not shown) may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, a network may be coupled with or overlap, at least in part, with the Internet. In one or more embodiments, a network includes a collection of one or more devices (e.g., computing device (100)) that facilitate network connectivity for one or more operatively connected devices (e.g., computing devices, data storage devices, other network devices, etc.) (not shown). In one or more embodiments, the network device and other devices within the network are arranged in a network topology (not shown). In one or more embodiments, a network topology is an arrangement of various devices of a network.

In one or more embodiments, the persistent storage (which may be or include non-volatile storage device (114)) and/or memory (which may be or include volatile storage device (104)) of computing device (100) may be or include one or more data repositories for storing any number of data structures storing any amount of data (i.e., information). In one or more embodiments, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage and/or memory of computing device (100) may be considered, in whole or in part, as non-transitory computer readable mediums storing, at least in part, software and/or firmware.

Such software and/or firmware may include instructions which, when executed by the one or more processors (not shown) or other hardware (e.g. circuitry) of computing device (100), cause the one or more processors and/or other hardware components to perform operations in accordance with one or more embodiments described herein.

Such software instructions may be in the form of computer readable program code to perform methods of embodiments as described herein and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, computing device (100) includes agent (102). In one or more embodiments, agent (102) is any hardware (e.g., circuitry), software, firmware, or any combination thereof that includes functionality to perform any tasks or actions for which it was designed. Examples of agent functionality include, but are not limited to: monitoring hardware; monitoring other software; monitoring log files; receiving information; parsing information; writing information (e.g., to hardware tables); performing repetitive tasks (e.g., data backup, memory management, etc.); providing an environment for a user to interact locally or remotely, with hardware and/or software components of computing device (100); automatically adding data to certain types of fields; performing management functions; simulating other software and/or hardware; sending and/or receiving signals (e.g., beacon signals) to determine if a device is still in contact with another device; any other task or action; or any combination thereof.

Agent (102) may be a process, or a part of a process, may include one or more threads within one or more processes, and/or may be capable of creating additional threads. Agent (102) may be operatively connected to volatile storage device (104) and to non-volatile storage device (114). In one or more embodiments, agent (102) executes using one or more processors (not shown) of computing device (100). Examples of agents include, but are not limited to, a networking protocol agent. Examples of such protocol agents include, but are not limited to: a Border Gateway Protocol (BGP) agent; an Interior Gateway Protocol (IGP) agent (e.g., Open Shortest Path First (OSPF), Routing Information Protocol (RIP), Intermediate System to Intermediate System (IS-IS), Enhanced Interior Gateway Routing Protocol (EIGRP), etc.); a forwarding information base (FIB) agent, a routing information base (RIB) agent, a system database agent, etc.

In one or more embodiments, agent (102) includes any number of agent portions (e.g., signal handlers) (not shown) that are configured to perform certain functionality when certain events occur. As a non-limiting example, agent (102) may include a signal handler configured to receive (e.g., intercept) a signal when agent (102) crashes (e.g., a 'fatal' signal) and, in response to receipt of such a signal, write an agent event information file (e.g., a crash file) to one or more locations in volatile storage device (104). Such an agent event file may, for example, include various items of information relating to the state of agent (102) at the time of a crash of agent (102) (e.g., register content, stack trace content, any other relevant information, etc.).

In one or more embodiments, computing device (100) includes volatile storage device (104). Volatile storage device (104) may be operatively connected to agent (102) and to agent event monitor (112). In one or more embodiments, volatile storage device (104) is any computer readable physical hardware medium that requires power to preserve (i.e., store, maintain) stored information (i.e., data). In one or more embodiments, temporary or permanent loss of power causes any information stored on volatile storage device (104) to be lost (e.g., erased). Examples of a volatile storage device include, but are not limited to, dynamic random access memory (DRAM), static random access memory (SRAM), processor caches, disk drive caches, video random access memory (VRAM), etc. In one or more embodiments, volatile storage device (104) includes functionality to be written to by agent (102) (e.g., agent event information files are written) and/or read from (e.g., during a debugging process prior to a power cycle of computing device (100)).

In one or more embodiments, volatile storage device (104) includes standard file location (106). In one or more embodiments, standard file location (106) is any portion of volatile storage device (104) in which information of any type may be stored using any scheme for storing information (e.g., a file system, a database, etc.). In one or more embodiments, standard file location (106) is a location (e.g., set of address locations) in volatile storage device (104) that has been configured to be written to by agent (102) when an agent event (e.g., an agent crash) has occurred. In one or more embodiments, standard file location (106) may be read from when a user seeks information related to an agent event prior to a power cycle of computing device (100). In one or more embodiments, standard file location (106) is lost when computing device (100) is power cycled. In one or more embodiments, standard debugging tools and/or techniques used by a user of computing device are configured to be aware of and able to read information from standard file location (106).

In one or more embodiments, volatile storage device (104) includes temporary file location (108). In one or more embodiments, temporary file location (108) is any portion of volatile storage device (104) in which information of any type may be stored using any scheme for storing information (e.g., a file system, a database, etc.). In one or more embodiments, temporary file location (108) is a location (e.g., set of address locations) in volatile storage device (104) that has been configured to be written to by agent (102) when an agent event (e.g., an agent crash) has occurred. In one or more embodiments, temporary file location (108) exists along with standard file location (106) so that standard file location (106) may be accessed, read from, modified, etc. (e.g., during a debugging process), while temporary file location (108) stores a second copy of the agent event information file as written by agent (102).

In one or more embodiments, volatile storage device (104) includes monitored file location (110). In one or more embodiments, monitored file location (110) is any portion of volatile storage device (104) in which information of any type may be stored using any scheme for storing information (e.g., a file system, a database, etc.). In one or more embodiments, monitored file location (110) is a location (e.g., set of address locations) in volatile storage device (104) that has been configured to be written to by agent (102) when an agent event (e.g., an agent crash) has occurred and after a write to temporary file location (108) has completed. Additionally or alternatively, in one or more embodiments, monitored file location (110) includes an identifier. In such an embodiment, a file previously written to temporary file location (108) may be renamed to include the identifier (e.g., directory information) of the monitored file location, thereby avoiding the need to actually make a copy of the file in temporary file location (108) in order to have the file appear in monitored file location (110) once the write of the file to temporary file location has been completed by agent (102).

In one or more embodiments, monitored file location (110) is monitored by agent event monitor (112), which monitors for the existence of agent event information files appearing in monitored file location (110). In one or more embodiments, monitored file location (110) exists along with temporary file location (108) so that the writing of an agent event file may be completed (i.e., the write to temporary file location (108) is complete) before a file appears (e.g., the write to monitored file location (110)) in monitored file location (110). In one or more embodiments, an agent event information file may be removed (e.g., deleted) from temporary file location (108) once the write of the file to monitored file location (110) is completed.

In one or more embodiments, computing device (100) includes agent event monitor (112). Agent event monitor may be operatively connected to volatile storage device (104) and to non-volatile storage device (114). In one or more embodiments, agent event monitor (112) is any hardware (e.g., circuitry), software, firmware, or any combination thereof that includes functionality to, at least, monitor monitored file location (110) and write agent event information files to non-volatile storage device (114). In one or more embodiments, agent event monitor (112) includes characteristics substantially similar to those discussed above in the description of agent (102). In one or more embodiments, agent event monitor (112) may be referred to as a process, a thread, a daemon, etc.

In one or more embodiments, agent event monitor (112) monitors monitored file location (110) using any scheme of determining when an agent event information file has been added to a storage location (e.g., a crash file has been written to monitored file location (110)). For example, agent event monitor (112) may use an inotify service to monitor the file locations within monitored file location (110). In one or more embodiments, the service used to monitor monitored file location (110) may not provide notification of the existence of an agent event information file until the write of such file is complete. In one or more embodiments, waiting until the file is complete prevents agent event monitor (112) from taking any action regarding the file prior to completion of the write to monitored file location (110). In other embodiments, agent event monitor (112) may begin taking action on an agent event information file in monitored file location (110) when the write to monitored file location begins.

In one or more embodiments, agent event monitor (112) includes functionality to write agent event information files to non-volatile storage device (114), or to not do so in certain circumstances (discussed further in the description of FIG. 2, below). In one or more embodiments, agent event monitor (112) includes functionality to remove (e.g., delete) agent event information files from monitored file location (110) once the agent event information file has been written to non-volatile storage device (114), or agent event monitor (112) has determined not to write the agent event information file to non-volatile storage device (114).

In one or more embodiments, agent event monitor includes functionality, prior to writing an agent event information file to non-volatile storage device (114) to give the file a uniquely identifiable filename. For example, a uniquely identifiable filename may be created using a combination of the name of the agent that produced the agent event information file and a hash of all or any portion of the file (e.g., the symbolic portion (e.g., offsets and function names) of the stack trace within the agent event information file). In one or more embodiments, a uniquely identifiable filename may be used to determine whether an identical agent event information file has previously been stored on non-volatile storage device (114), in which case the agent event information file may be discarded, or stored in a manner that links the newer file with the older file. In one or more embodiments, an agent event information file may be compressed prior to being written to non-volatile storage device (114).

In one or more embodiments, computing device (100) includes non-volatile storage device (114). Non-volatile storage device (114) may be operatively connected to agent (102) and to agent event monitor (112). In one or more embodiments, non-volatile storage device (114) is any computer readable physical hardware medium that does not require power to preserve (i.e., store, maintain) stored information (i.e., data). In one or more embodiments, temporary or permanent loss of power does not cause any information stored on non-volatile storage device (114) to be lost (e.g., erased). Examples of a non-volatile storage device include, but are not limited to, flash memory, read-only memory, hard disk drives, solid state drives, optical discs, tape storage devices, etc.

While FIG. 1 shows a configuration of components, other configurations may be used without departing from the scope of embodiments described herein. For example, a computing device may include any number of agents. As another example, a computing device may include any number of volatile storage devices. As another example, a computing device may include any number of volatile storage devices. As another example, a computing device may include any number of agent event monitors. As another example, any storage device of a computing device may include any number of file locations for storing any type of information. Accordingly, embodiments disclosed herein should not be limited to the configuration of components shown in FIG. 1.

Figure 2:
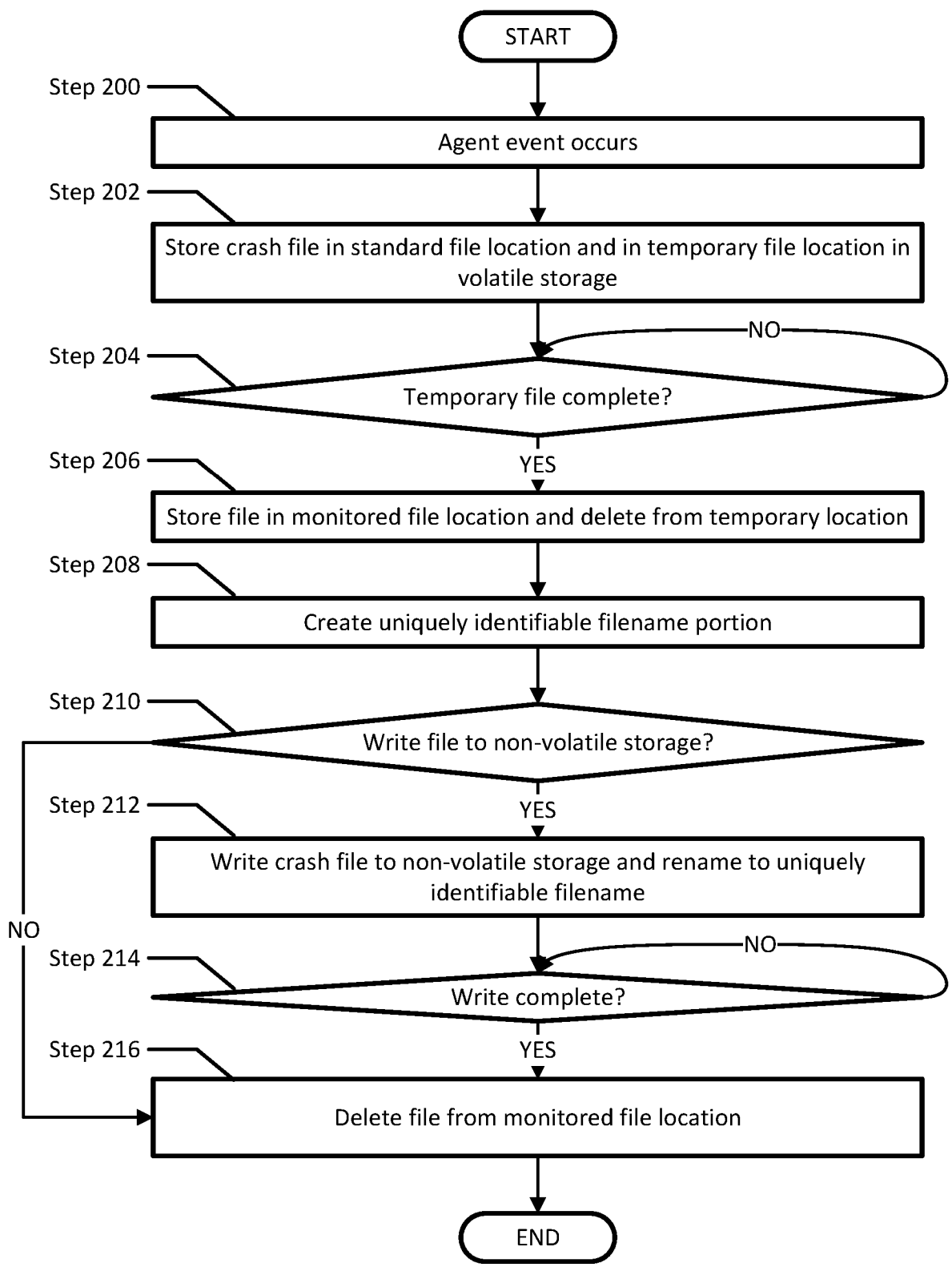
FIG. 2 shows a flowchart in accordance with one or more embodiments described herein.

FIG. 2 shows a flowchart describing a method for storing agent event information files in accordance with one or more embodiments described herein. The method for creating and using an information sharing topology shown in FIG. 2 is only one example of a particular scheme for storing agent event information in a persistent manner. Accordingly, embodiments described herein should not be considered limited to the information sharing topology creation and use shown in FIG. 2.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, an agent event occurs. In one or more embodiments, an agent event is anything that would cause an agent to create an agent event information file. For example, an agent event information file may be created when an agent crashes. In one or more embodiments, an agent event triggers a signal handler to intercept a signal from an agent that an agent event occurred and to take certain configured actions based on receipt of such a signal.

In Step 202, the agent experiencing an agent event stores the agent event information file in both a standard file location and a temporary file location in a volatile storage device. In one or more embodiments, storing an agent event information file in a standard file location enables standard debugging practices to occur on such a file. In one or more embodiments, storing the agent event information file in the temporary file location allows the agent to write the agent event information in a file that can be completed prior to a copy of the agent event information file to a location monitored by an agent event monitor.

In Step 204, a determination is made as to whether the writing of the temporary file has been completed. In one or more embodiments, if the writing of the agent event information file has not yet been completed, the process returns to Step 204 and continues to wait for the write to complete. In one or more embodiments, if the write to the temporary file location has been completed, the method proceeds to Step 206.

In Step 206, the completed agent event information file is written to a monitored file location in the volatile storage. In one or more embodiments, writing the agent event information file to the monitored file location includes copying the file from the temporary file location. In one or more embodiments, writing the agent event information file to the monitored file location includes renaming the agent event information file in the temporary file to be in the monitored file location, thereby avoiding the extra copy of the file.

In one or more embodiments, waiting to write the agent event information file to the monitored file location until the write to the temporary file location in complete prevents an agent event monitor from taking any action on the agent event information file until the write of the file has been completed. Having the monitor wait for a completed agent event information file before taking action may prevent unwanted actions from occurring. For example, if an uncompleted agent event information file is acted on by a monitor, and the monitor creates a uniquely identifiable filename based on the incomplete portion, and the filename matches an existing filename in non-volatile storage, and the newer file overwrites the older file, then more complete information from the older file relating to an agent event may be lost. In one or more embodiments, once the write to the monitored file location is complete, the agent may delete the file from the temporary file location, thereby saving storage space in the temporary file location. Such a deletion may be an actual deletion of the file, and/or occur when the agent event information file is renamed to be in the monitored file location.

In one or more embodiments, although not shown in FIG. 2, one having ordinary skill in the art will appreciate that other schemes of getting the agent event file to the monitor. For example, the temporary location may be eliminated, and the file may be copied directly from the standard file location to the monitored file location when it is complete. As another example, once the agent event file is complete in either the temporary location or the standard location, the agent may write a pointer in the monitored location to the temporary or standard file location. In such a scenario, when the monitor becomes aware of the pointer, the monitor may then use the pointer to access whatever location is storing the agent event information file.

In Step 208, the agent event monitor becomes aware that an agent event information file has been written to the monitored file location. For example, an inotify service may be set up that alerts the agent event monitor that a write has happened within the monitored file location, which be less resource intensive than merely monitoring the monitored file location using other file monitoring schemes. In one or more embodiments, once the agent event file monitor becomes aware that an agent event file has appeared in the monitored file location, the agent event monitor creates a uniquely identifiable filename portion. For example, the agent event monitor may create a hash of the symbolic portion of the stack trace within the agent event information file. In one or more embodiments, using the symbolic portion of the stack trace creates a hash that is the same hash for each instance of an agent event, as the symbolic portion of the stack trace may not change for repetitive crashes that happen for the same or similar reasons, because the hash of the symbolic portion only uses the portion of the stack trace that does not change from agent event to agent event (e.g., the offsets and the function names).

In Step 210, a determination is made as to whether the agent event information file should be written to non-volatile storage. In one or more embodiments, the uniquely identifiable filename portion created in Step 208 is used to determine if a non-volatile storage device already includes an agent event information file that includes the uniquely identifiable filename portion (e.g., a hash of the agent event information file, or a portion thereof). In one or more embodiments, if the non-volatile storage device does not include such a file, and the non-volatile storage device has storage space remaining that is sufficient to store the agent event information file, the method proceeds to Step 212.

In one or more embodiments, if the non-volatile storage device does include a file with a filename that includes, at least in part, the uniquely identifiable filename portion, then the method further determines whether the agent event information file should be written to the non-volatile storage device. In one or more embodiments, such a determination is made by determining whether any existing agent event information file on the non-volatile storage device may be deleted.

In one or more embodiments, such a determination is made based on certain characteristics of the existing agent event information files.

In one or more embodiments, the oldest agent event information file is identified and deleted to make space for the new agent event information file. In one or more embodiments, the priority of the current agent event information file is compared to the priority assigned to the agent event information files that exist within the non-volatile storage device. For example, an existing agent event information file may be assigned a high priority ranking, and, as such, may not be replaced by a lower priority agent event information file sooner than 10 days of existing on the non-volatile storage device. Therefore, in one or more embodiments, the new agent event information file must be assessed to determine: first, does it outrank any existing agent event information file in priority; and second, if it does not, has a threshold been reached that makes it appropriate to replace the older agent event information file with the new agent event information file. In one or more embodiments, if either condition is true, the method proceeds to Step 212. In one or more embodiments, if there is no storage space left in the non-volatile storage device, the priority of the new agent event information file is not higher than any existing agent event information file in the non-volatile storage device, and there are no parameters that lead to a conclusion that an existing agent event information file should be replaced by the new agent event information file, then the method proceeds to Step 216.

In Step 212, the agent event information file is written to the non-volatile storage device. In one or more embodiments, the write is performed by the agent event monitor. In one or more embodiments, the write is made to a location in the non-volatile storage device that is separate from existing agent event information files. In one or more embodiments, once the write to the non-volatile storage device is complete, the file is renamed. In one or more embodiments, the file is renamed to a uniquely identifiable filename. For example, the filename may include a hash of the symbolic portion of the stack trace of the agent event information file and the name of the agent that crashed. In one or more embodiments, the renaming of the agent event information file causes any existing agent event information file having the same uniquely identifiable filename to be replaced with the new agent event information file of the same name.

In Step 214, a determination is made as to whether the write to non-volatile storage and subsequent rename are complete. In one or more embodiments, if the aforementioned actions are not complete, the process waits until they are complete. In one or more embodiments, if the aforementioned actions are complete, the method proceeds to Step 216.

In Step 216, upon a determination that the write to non-volatile storage and subsequent rename are complete or that the agent event information file should not be stored (see Step 210 description), the agent event monitor deletes the agent event information file from the monitored file location. In one or more embodiments, such a deletion ensures that the monitored file location conserves as much information storage space as possible.

Figure 3:
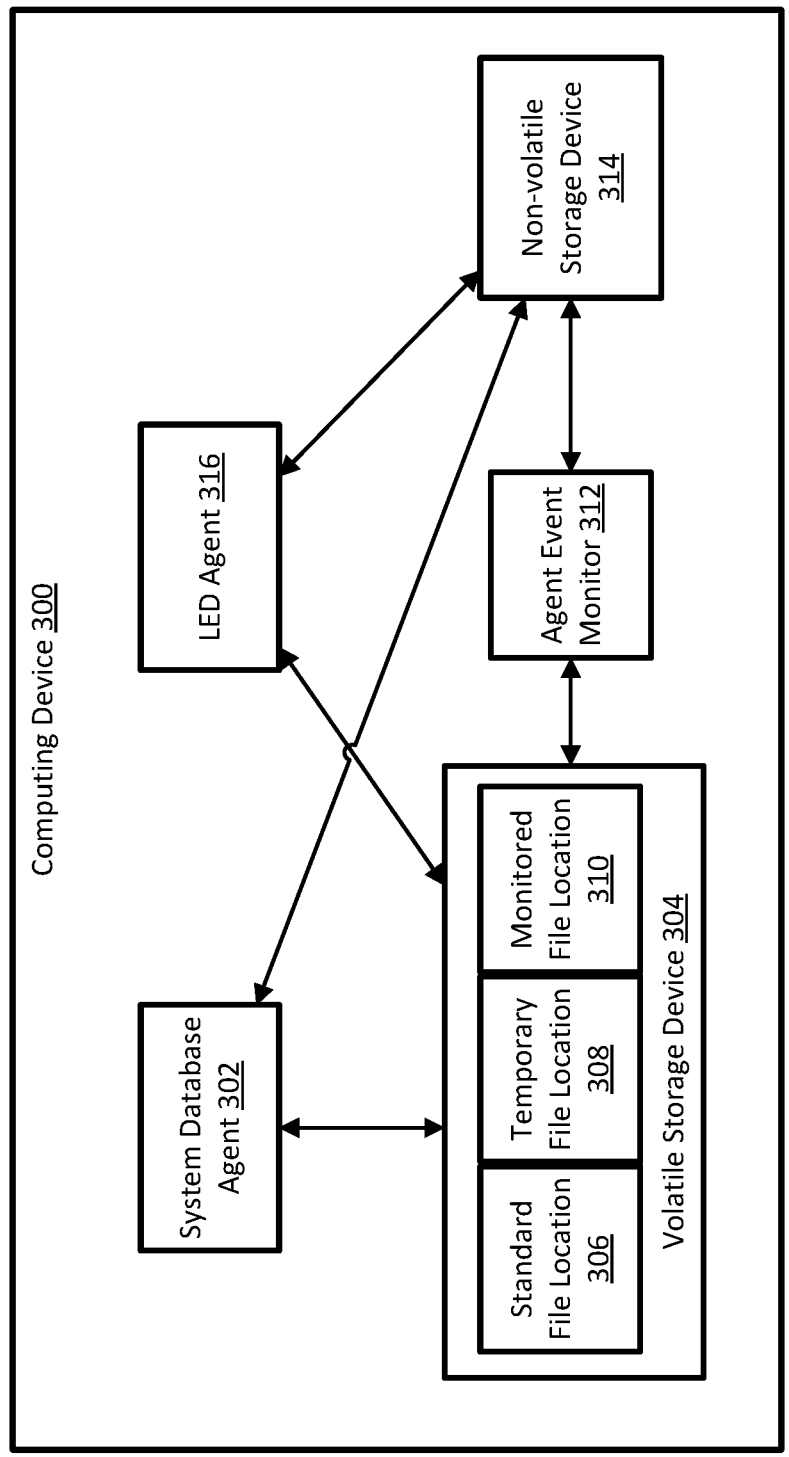
FIG. 3 shows an example in accordance with one or more embodiments of described herein.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 3, consider a scenario in which a computing device (300) is executing two agents (system database agent (302) and LED agent (316)). In one or more embodiments, computing device (300) also includes volatile storage device (304) and non-volatile storage device (314). Volatile storage device (304) includes standard file location (306), temporary file location (308), and monitored file location (310). In one or more embodiments, computing device (300) also includes agent event monitor (312).

In such a scenario, at a first time, system database agent (302) crashes. When the crash occurs, system database agent (302) sends a signal related to the crash. The signal is intercepted by a signal handler of system database agent (302) that is configured to take action in the event of receipt of such a signal. The actions include writing a crash file to standard file location (306) and to temporary file location (308). Once the write to temporary file location (308) is complete, the crash file is copied to monitored file location (310).

In one or more embodiments, once the write to monitored file location (310) is complete, an inotify service alerts agent event monitor (312) that a file has appeared within monitored file location (310). Next, agent event monitor (312) creates a hash of the symbolic portion of the stack trace within the agent event information file stored in the monitored file location. Next, the hash is compared to filename portions of files already existing within non-volatile storage device (314), and a determination is made that there are no filenames that include the hash value, and that non-volatile storage device (314) includes enough remaining storage space to store the agent event information file. Therefore, the agent event information file is compressed and given a filename that includes the name of the agent that crashed, and the hash value, and then stored in non-volatile storage device (314).

Considering the same scenario, at a second time, LED agent (316) crashes. When the crash occurs, LED agent (316) sends a signal related to the crash. The signal is intercepted by a signal handler of LED agent (316) that is configured to take action in the event of receipt of such a signal. The actions include writing a crash file to standard file location (306) and to temporary file location (308). Once the write to temporary file location (308) is complete, the crash file is copied to monitored file location (310).

In one or more embodiments, once the write to monitored file location (310) is complete, an inotify service alerts agent event monitor (312) that a file has appeared within monitored file location (310). Next, agent event monitor (312) creates a hash of the symbolic portion of the stack trace within the agent event information file stored in the monitored file location. Next, the hash is compared to filename portions of files already existing within non-volatile storage device (314), and a determination is made that there are no filenames that include the hash value, and that non-volatile storage device (314) does not include enough remaining storage space to store the agent event information file, but that the agent event information file is newer than any agent event information file in the non-volatile storage device. Next, the priority of the LED agent is assessed relative to the priorities of the agents for which agent event information files are stored in non-volatile storage device (314), and a determination is made that the LED agent has a lower priority than any agent for whom an agent event information file is currently being stored. Accordingly, the LED agent event information file is not stored, and the copy in monitored file location (310) is deleted.

Considering the same scenario, at a third time, system database agent (302) crashes. When the crash occurs, system database agent (302) sends a signal related to the crash. The signal is intercepted by a signal handler of system database agent (302) that is configured to take action in the event of receipt of such a signal. The actions include writing a crash file to standard file location (306) and to temporary file location (308). Once the write to temporary file location (308) is complete, the crash file is copied to monitored file location (310).

In one or more embodiments, once the write to monitored file location (310) is complete, an inotify service alerts agent event monitor (312) that a file has appeared within monitored file location (310). Next, agent event monitor (312) creates a hash of the symbolic portion of the stack trace within the agent event information file stored in the monitored file location. Next, the hash is compared to filename portions of files already existing within non-volatile storage device (314), and a determination is made that there are no filenames that include the hash value, and that non-volatile storage device (314) does not include enough remaining storage space to store the agent event information file. Next, the priority of the system database agent is assessed relative to the priorities of the agents for which agent event information files are stored in non-volatile storage device (314), and a determination is made that the system database agent has a higher priority than any agent for whom an agent event information file is currently being stored. Accordingly, the LED agent event information file is stored, and at least one agent event information file in the non-volatile storage device is deleted. Once the write is complete, the copy in monitored file location (310) is deleted.

In one or more embodiments, because of the writes to non-volatile storage device, agent event information files remain available for debugging purposes even after a power cycle of computing device (300).

In the above description, numerous details are set forth as examples of embodiments described herein. It will be understood by those skilled in the art, and having the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While a limited number of embodiments have been described herein, those skilled in the art, having benefit of this disclosure, will appreciate that other embodiments can be devised which do not depart from the scope of the embodiments described herein. Accordingly, the scope of embodiments described herein should be limited only by the attached claims.

What is claimed is:

1. A method, comprising:
    making, by a monitor, a first determination that an event information file exists in a volatile storage device location in a volatile storage device, wherein the first determination is made after an agent event occurs;
    performing, by the monitor, an action on a portion of the event information file to obtain a uniquely identifiable filename portion;
    writing, by the monitor, an event information file copy to a non-volatile storage location in a non-volatile storage device; and
    after writing the event information file copy to the non-volatile storage location is complete:
        renaming, by the monitor, the event information file copy to a uniquely identifiable filename comprising the uniquely identifiable filename portion,
        wherein the renaming causes the event information file copy to replace an older event information file copy, and
        wherein the older event information file copy is associated with the uniquely identifiable filename portion.

2. The method of claim 1, wherein an agent is associated with the agent event, and wherein the method further comprises:
    writing, by the agent, the event information file to a temporary location in the volatile storage device;
    after the writing of the event information file to the temporary location in the volatile storage device is complete:
        copying, by the agent, the event information file to the volatile storage device location; and
        deleting, by the agent, the event information file from the temporary location after the copying is complete.

3. The method of claim 1, wherein the event information file copy is a compressed version of the event information file.

4. The method of claim 1, further comprising:
    after the renaming is complete:
        deleting, by the monitor, the event information file from the volatile storage device location.

5. The method of claim 1, wherein the monitor is configured with an event information file copy threshold that defines a maximum quantity of renamed event information file copies that may be stored on the non-volatile storage device.

6. The method of claim 5, wherein, after the event information file copy threshold is reached, the method further comprises:
    deleting, by the monitor, the older event information file copy before writing the event information file copy to the non-volatile storage location.

7. A non-transitory computer readable medium comprising instructions that, when executed by a processor, perform a method, the method comprising:
    making, by a monitor, a first determination that a pointer to an event information file exists in a volatile storage device location in a volatile storage device, wherein the first determination is made after an agent event occurs;
    obtaining the event information file from a temporary location pointed to by the pointer;
    performing, by the monitor, an action on a portion of the event information file to obtain a uniquely identifiable filename portion;
    writing, by the monitor, an event information file copy to a non-volatile storage location in a non-volatile storage device, wherein the monitor is configured with an event information file copy threshold that defines a maximum quantity of renamed event information file copies that may be stored on the non-volatile storage device; and
    after writing the event information file copy to the non-volatile storage location is complete:
        renaming, by the monitor, the event information file copy to a uniquely identifiable filename comprising the uniquely identifiable filename portion.

8. The non-transitory computer readable medium of claim 7, wherein an agent is associated with the agent event, and wherein the method further comprises:

writing, by the agent, the pointer to the temporary location in the volatile storage device; and after the event information file is obtained by the monitor:

deleting, by the agent, the event information file from the temporary location.

9. The non-transitory computer readable medium of claim 7, wherein the renaming causes the event information file copy to replace an older event information file copy, and wherein the older event information file copy is associated with the uniquely identifiable filename portion.

10. The non-transitory computer readable medium of claim 7, wherein the event information file copy is a compressed version of the event information file.

11. The non-transitory computer readable medium of claim 7, wherein the method further comprises:

after the renaming is complete:

deleting, by the monitor, the event information file from the volatile storage device location.

12. The non-transitory computer readable medium of claim 7, wherein, after the event information file copy threshold is reached, the method further comprises:

deleting, by the monitor, an older event information file copy before writing the event information file copy to the non-volatile storage location.

13. A computing device, comprising:

a processor;

a volatile storage device;

a non-volatile storage device;

an agent executing on the processor; and a monitor, executing on the processor and configured to:

make a first determination that an event information file exists in a volatile storage location in the volatile storage device, wherein the first determination is made after an agent event occurs;

perform an action on a portion of the event information file to obtain a uniquely identifiable filename portion;

write an event information file copy to a non-volatile storage location in the non-volatile storage device; and after writing the event information file copy to the non-volatile storage location is complete:

rename the event information file copy to a uniquely identifiable filename comprising the uniquely identifiable filename portion, wherein the agent is associated with the agent event, and wherein the agent is configured to:

write the event information file to a standard location in the volatile storage device; and after the writing of the event information file to the standard location in the volatile storage device is complete:

copy the event information file to the volatile storage location.

14. The computing device of claim 13, wherein the rename causes the event information file copy to replace an older event information file copy, and wherein the older event information file copy is associated with the uniquely identifiable filename portion.

15. The computing device of claim 13, wherein the event information file copy is a compressed version of the event information file.

16. The computing device of claim 13, wherein the monitor is further configured to:

after the rename is complete:

delete the event information file from the volatile storage location.

17. The computing device of claim 13, wherein:

the monitor is configured with an event information file copy threshold that defines a maximum quantity of renamed event information file copies that may be stored on the non-volatile storage device, and after the event information file copy threshold is reached, the monitor is further configured to:

delete an older event information file copy before writing the event information file copy to the non-volatile storage location.

* * * * *